United States Patent
Li et al.

(10) Patent No.: US 10,570,239 B1
(45) Date of Patent: Feb. 25, 2020

(54) SURFACE-ACTIVE TWO-TAILED HYDROPHOBIC ASSOCIATED POLYMER AND PREPARATION METHOD THEREOF

(71) Applicant: SOUTHWEST PETROLEUM UNIVERSITY, Chengdu (CN)

(72) Inventors: Yongming Li, Chengdu (CN); Qiang Ren, Chengdu (CN); Jinzhou Zhao, Chengdu (CN); Liehui Zhang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 114 days.

(21) Appl. No.: 16/069,167

(22) PCT Filed: May 22, 2017

(86) PCT No.: PCT/CN2017/085329
§ 371 (c)(1),
(2) Date: Jul. 10, 2018

(87) PCT Pub. No.: WO2018/209717
PCT Pub. Date: Nov. 22, 2018

(30) Foreign Application Priority Data

May 16, 2017 (CN) .......................... 2017 1 0342098

(51) Int. Cl.
| | | |
|---|---|---|
| C08F 2/46 | (2006.01) | |
| C08F 2/50 | (2006.01) | |
| C08G 61/04 | (2006.01) | |
| C08F 283/06 | (2006.01) | |
| C09K 8/72 | (2006.01) | |
| C09K 8/584 | (2006.01) | |

(52) U.S. Cl.
CPC .......... *C08F 283/065* (2013.01); *C09K 8/584* (2013.01); *C09K 8/725* (2013.01)

(58) Field of Classification Search
CPC ............... C08F 2/46; C08F 2/50; C08G 61/04
USPC ........... 522/40, 33, 6, 71, 189, 184, 1; 520/1
See application file for complete search history.

(56) References Cited

U.S. PATENT DOCUMENTS

2014/0287967 A1    9/2014  Favero et al.

FOREIGN PATENT DOCUMENTS

| CN | 100999875 A | 7/2007 |
|---|---|---|
| CN | 104140507 A | 11/2014 |
| CN | 104231169 | * 12/2014 |
| CN | 104231169 A | 12/2014 |
| CN | 105418862 A | 3/2016 |
| WO | 2012170373 A3 | 2/2013 |

OTHER PUBLICATIONS

Shang et al, CN 104231169 Machine Translation, Dec. 24, 2014 (Year: 2014).*
Xuehong Huang et al.,Study on Properties of Water-soluble Hydrophobic Associated Poly(Acrylamide-Hexadecyl Acrylate).Journal of Functional Polymers, 2002,14(1):90-94.
Chuangrong Zhong et al., Characterization and Heat Resistance of AM-STD-NaAMPS Ternary Hydrophobic Associated Copolymer. Polymer Materials Science and Engineering, 2003, 19 (6): 126-130.
Shan Luo et al., Synthesis and Solution Property of Imidazoline-structured Hydrophobic Associated Polymer, Chemical Research and Application, 2015,27(8):1151-1156.
Tongmou Geng et al. Viscosity Behavior of Aqueous Solution of Hydrophobic Associated Water Soluble Polymer P (AM/NaAA/DiAC16). Fine Chemicals, 2007, 24(9):914-918.
Xiaoyan Wu et al. A Surface-active Two-tailed Hydrophobic Associated Acrylamide Copolymer. Guangdong Chemical Industry, 2014, 41(22): 42-44.
Feng Jiang et al. Synthesis and characterization of Two-tailed Acrylamide Hydrophobic Associated Copolymers. Journal of Chemical Industry,, 2015,66(3):1215-1220.
L'Alloret F et al. Aqueous solution behavior of new thermoassociative polymers. Colloid & Polymer Science, 1995, 273(12): 1163-1173.
Mingzhu Yang et al. Study on Properties of Novel Thermosensitive Modified Acrylamide Copolymer. Plastics Industry, 2012, 40(4):35-38.

* cited by examiner

Primary Examiner — Jessica Whiteley
(74) Attorney, Agent, or Firm — Bayramoglu Law Offices LLC

(57) ABSTRACT

The present invention provides a surface-active two-tailed hydrophobic associated polymer and a preparation method thereof. The surface-active two-tailed hydrophobic associated polymer is prepared using a micellar free radical copolymerization method including: adding a surfactant sodium lauryl sulfate and a hydrophobic monomer N-phenethyl-N-alkyl (methyl) acrylamide or N-benzyl-N-alkyl (methyl) acrylamide into an aqueous solution containing acrylamide, acrylic acid, 2-acrylamide-2-methylpropanesulfonic acid, and surface-active macromonomer polyoxyethylene lauryl ether (methyl) acrylate, wherein the surfactant is used to solubilize the hydrophobic monomer in the formed micelle; adjusting pH to 6-8 with sodium hydroxide, and copolymerizing the hydrophobic monomer and a water-soluble monomer by means of photoinitiation. The properties, such as viscosifying property, temperature resistance, salt resistance and hydrolysis resistance, of the hydrophobic associated polymer can be effectively improved. The preparation method is reliable in principle and simple in operation and has a wide market prospect.

6 Claims, 5 Drawing Sheets

SURFACE-ACTIVE TWO-TAILED HYDROPHOBIC ASSOCIATED POLYMER AND PREPARATION METHOD THEREOF

CROSS REFERENCE TO RELATED APPLICATIONS

This application is the national phase entry of International Application NO. PCT/CN2017/085329, filed on May 22, 2017, which is based upon and claims priority to Chinese Patent Application No. 2017103420982, filed on May 16, 2017, the entire contents of which are incorporated herein by reference.

TECHNICAL FIELD

The present invention relates to a surface-active two-tailed hydrophobic associated polymer for an oilfield to increase a recovery rate and perform acid fracturing, and a preparation method thereof.

BACKGROUND

Traditional polymers, such as partially hydrolyzed polyacrylamide (HPAM), have poor temperature resistance, salt resistance, and shear resistance. Under high-temperature and high-salt conditions of an oil reservoir, the viscosity of a polymer solution drastically decreases due to hydrolysis, thermal degradation, chain curling and the like of HPAM, and therefore the requirements for enhanced oil recovery and acid fracturing of the high-temperature and high-salt oil reservoir cannot be met. For a hydrophobic associated polymer in which a small amount of hydrophobic groups are introduced into molecular chains, the solution of the hydrophobic associated polymer has efficient viscosifying property, excellent salt resistance, and better temperature resistance and shear resistance, and has a favorable application prospect in enhanced oil recovery and acid fracturing of an oil field.

The properties of a solution of a hydrophobic associated polymer depend on the structure and property of a hydrophobic monomer to a certain degree. The differences in the structure and variety of hydrophobic monomers can greatly affect the properties of the polymer. Hydrophobic monomers that have been reported so far include (methyl) acrylate monomer, styrene monomer, (methyl) acrylamide monomer, allyl monomer, and the like. Acrylate-type hydrophobic monomers, which are extremely sensitive to temperature and pH, can easily lead to the decrease of the viscosity of the polymer solution because of the loss of the association effect of the polymer (Huang Xuehong et al., Study on Properties of Water-soluble Hydrophobic Associated Poly (Acrylamide-Hexadecyl Acrylate ). Journal of Functional Polymers, 2002,14(1):90-94). Although the styrene-type hydrophobic monomer has a rigid benzene ring and can effectively improve the temperature resistance and hydrolysis resistance of the polymer, the benzene ring is too close to a molecular main chain, which is not conducive to the copolymerization of the hydrophobic monomer and acrylamide, and also not conducive to improve the viscosifying effect of the polymer solution (Zhong Chuanyong, Characterization and Heat Resistance of AM-STD-NaAMPS Ternary Hydrophobic Associated Copolymer. Polymer Materials Science and Engineering, 2003, 19 (6): 126-130). The allyl type hydrophobic monomer, due to the presence of allyl groups, is not easily copolymerized with main monomer acrylamide, and the prepared hydrophobic associated polymer has a low molecular weight and an unobvious viscosifying effect (Luo Shan et al., Synthesis and Solution Property of Imidazoline-structured Hydrophobic Associated Polymer. Chemical Research and Application, 2015,27(8):1151-1156). The acrylamide-type hydrophobic monomer whose structure is similar to acrylamide is conducive to a polymerization reaction, but there is a shortcoming of poor resistance to hydrolysis. (Geng Tongmou, Viscosity Behavior of Aqueous Solution of Hydrophobic Associated Water Soluble Polymer P(AM/NaAA/DiAC16). Fine Chemicals, 2007, 24(9): 914-918).

Compared with a single-tailed hydrophobic monomer, a double-tail hydrophobic monomer containing a benzene ring and a long-chain alkyl group (Wu Xiaoyan et al. A Surface-active Two-tailed Hydrophobic Associated Acrylamide Copolymer. Guangdong Chemical Industry, 2014, 41(22): 42-44; Jiang Feng et al. Synthesis and characterization of Two-tailed Acrylamide Hydrophobic Associated Copolymers. Journal of Chemical Industry, 2015,66(3):1215-1220) has the following advantages: by the introduction of the benzene ring, the temperature resistance and hydrolysis resistance of the polymer are effectively improved; by the introduction of the long-chain alkyl group, the hydrophobic association effect of the polymer is improved favorably; a main structure of (methyl) acrylamides is adopted to make the hydrophobic monomer easy to polymerize with acrylamide; the two-tailed structure is conductive to improve the hydrolysis resistance and hydrophobic association effect of the hydrophobic monomer. Therefore, the hydrophobic monomer integrates the advantages of various types of hydrophobic monomers, and can more significantly improve the hydrophobic association effect of the polymer, so that the synthesized hydrophobic associated polymer achieves the purposes of temperature resistance and salt resistance.

For a polymer containing polyoxyethylene ether side chains (L'alloret F et al. Aqueous solution behavior of new thermoassociative polymers. Colloid & Polymer Science, 1995, 273(12): 1163-1173; Yang Mingzhu et al. Study on Properties of Novel Thermosensitive Modified Acrylamide Copolymer. Plastics Industry, 2012, 40(4):35-38), a polyoxyethylene ether chain in the molecule and a water molecule form a hydrogen bond. As the temperature of the solution rises, the effect of the hydrogen bond gradually weakens or the hydrogen bond is broken, the hydrophilicity of the polyoxyethylene ether chain decreases, and the hydrophobicity increases, thereby allowing the polymer to exhibit a favorable thermal thickening effect within a higher temperature range, and show higher apparent viscosity in a salt solution.

SUMMARY

An objective of the present invention is to provide a surface-active two-tailed hydrophobic associated polymer which integrates the advantages of a double-tail hydrophobic associated polymer and the advantages of a polymer containing a polyoxyethylene ether side chain, such that the viscosifying property, the temperature resistance, the salt resistance and the hydrolysis resistance of the hydrophobic associated polymer are remarkably improved, and overcomes the defects and deficiencies of the prior art.

Another objective of the present invention is to provide a preparation method of the surface-active two-tailed hydrophobic associated polymer. The preparation method is reliable in principle and simple and convenient in operation. The synthesized polymer can be widely used as an oil-displacing agent or an acid fracturing thickener for increasing a crude oil recovery rate in oilfield development and has a broad market application prospect.

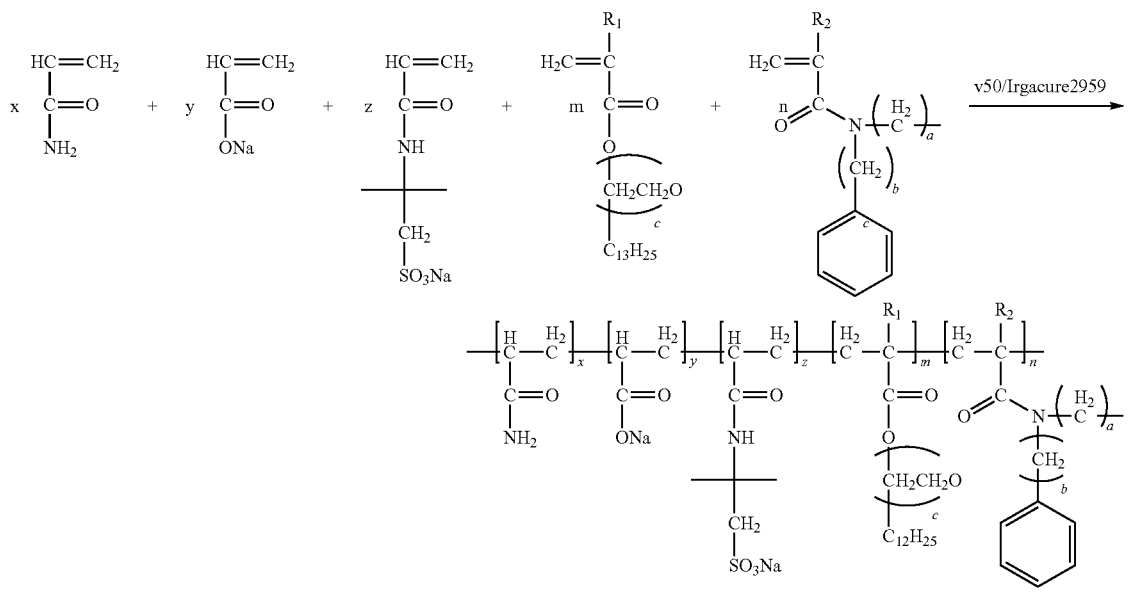

To fulfill said technical objectives, the present invention adopts the following technical solution.

A surface-active two-tailed hydrophobic associated polymer has the following structural formula:

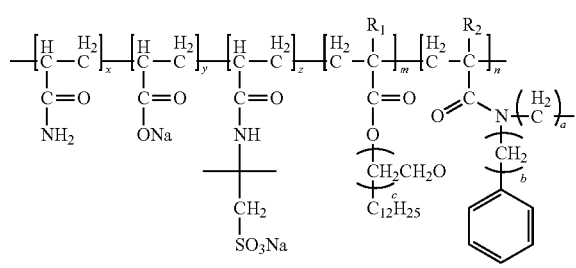

in the formula, x, y, z, m, and n are percentages of structural units, where x is 75 to 85%, y is 10 to 20%, z is 0 to 5%, m is 0.1 to 0.2%, n is 0.2 to 0.5%, and x+y+z+m+n is 1; a, b and c are numbers of structural units, wherein a is 7, 9, 11, 13 or 15, b is 1 or 2, and c is 5, 7, 10, 23 or 40; $R_1$ and $R_2$ are $CH_3$ or H.

The polymer has a viscosity average molecular weight of 100 to 10,000,000.

The surface-active two-tailed hydrophobic associated polymer is prepared using a micellar free radical copolymerization method comprising: adding a surfactant sodium lauryl sulfate and a hydrophobic monomer N-phenethyl-N-alkyl (methyl) acrylamide or N-benzyl-N-alkyl (methyl) acrylamide into an aqueous solution containing acrylamide, acrylic acid, 2-acrylamide-2-methylpropanesulfonic acid, and surface-active macromonomer polyoxyethylene lauryl ether (methyl) acrylate, wherein the surfactant is used to solubilize the hydrophobic monomer in the formed micelle; adjusting pH to 6-8 with sodium hydroxide; and copolymerizing the hydrophobic monomer and a water-soluble monomer by means of photoinitiation to obtain the surface-active two-tailed hydrophobic associated polymer. The reaction principle is as follows:

in the formula, x, y, z, m, and n are percentages of structural units, where x is 75 to 85%, y is 10 to 20%, z is 0 to 5%, m is 0.1 to 0.2%, n is 0.2 to 0.5%, and x+y+z+m+n is 1; a, b and c are numbers of structural units, wherein a is 7, 9, 11, 13 or 15, b is 1 or 2, and c is 5, 7, 10, 23 or 40; $R_1$ and $R_2$ are $CH_3$ or H.

The polymer has a viscosity average molecular weight of 100 to 10,000,000.

A preparation process of the surface-active two-tailed hydrophobic associated polymer comprises the following steps:

(1) adding acrylamide, acrylic acid, 2-acrylamide-2-methylpropanesulfonic acid, and surface-active macromonomer polyoxyethylene lauryl ether (methyl) acrylate to distilled water, stirring uniformly, adjusting pH of the solution to 6-8 with sodium hydroxide, adding a hydrophobic monomer N-phenethyl-N-alkyl (methyl) acrylamide or N-benzyl-N-alkyl (methyl) acrylamide and a surfactant sodium lauryl sulfate, and stirring till the solution is clear and transparent, wherein the total mass percentage of reaction monomers is 25 to 30 wt %, in which acrylamide accounts for 20 to 21.5 wt %, acrylic acid accounts for 3.5 to 5 wt %, 2-acrylamide-2-methylpropanesulfonic acid accounts for 0 to 2 wt %, polyoxyethylene lauryl ether (methyl) acrylate accounts for 0.2 to 0.6 wt %, N-phenethyl-N-alkyl (methyl) acrylamide or N-benzyl-N-alkyl (methyl) acrylamide accounts for 0.2 to 0.6 wt %, and sodium lauryl sulfate accounts for 0.8 to 2.0 wt %;

(2) introducing nitrogen for 15 min to remove dissolved oxygen in water; and (3) adding a photoinitiator and reacting for 3 to 5 h at 10 to 30° C. under a photoinitiation device to obtain viscous white colloid, i.e., the surface-active two-tailed hydrophobic associated polymer.

The photoinitiator is azobis (isobutylamidine hydrochloride) (v50) or 2-hydroxyl-4'-(2-hydroxyethoxy)-2-methylpropiophenone (Irgacure 2959).

Compared with the prior art, the present invention has the following beneficial effects: (1) the hydrophobic monomer with an acrylamide structure is easily copolymerized with water-soluble monomers, such as acrylamide; because the hydrophobic chain of the hydrophobic monomer has a benzene ring structure, the hydrolysis of amide groups can be effectively inhibited, and meanwhile the rigidity of molecular chains can be increased and the temperature resistance of the polymer can be improved; because the hydrophobic chain of the hydrophobic monomer contains a long-chain alkyl group, the hydrophobic association effect is achieved; the double-tail structure of the hydrophobic monomer can effectively inhibit the hydrolysis of amide groups and improve the hydrophobic association effect. Therefore, the hydrophobic associated polymer has better viscosifying property, and resistance to temperature and salt;

(2) by the introduction of surface-active macromonomers containing polyoxyethylene ether and long-chain alkyl groups into polymer molecular chains, the polymer has the properties of the surfactant, and the properties of the hydrophobic associated polymer, such as viscosifying property, temperature resistance, salt resistance, and hydrolysis resistance, can be significantly improved.

DETAILED DESCRIPTION OF THE EMBODIMENTS

Figure 1:
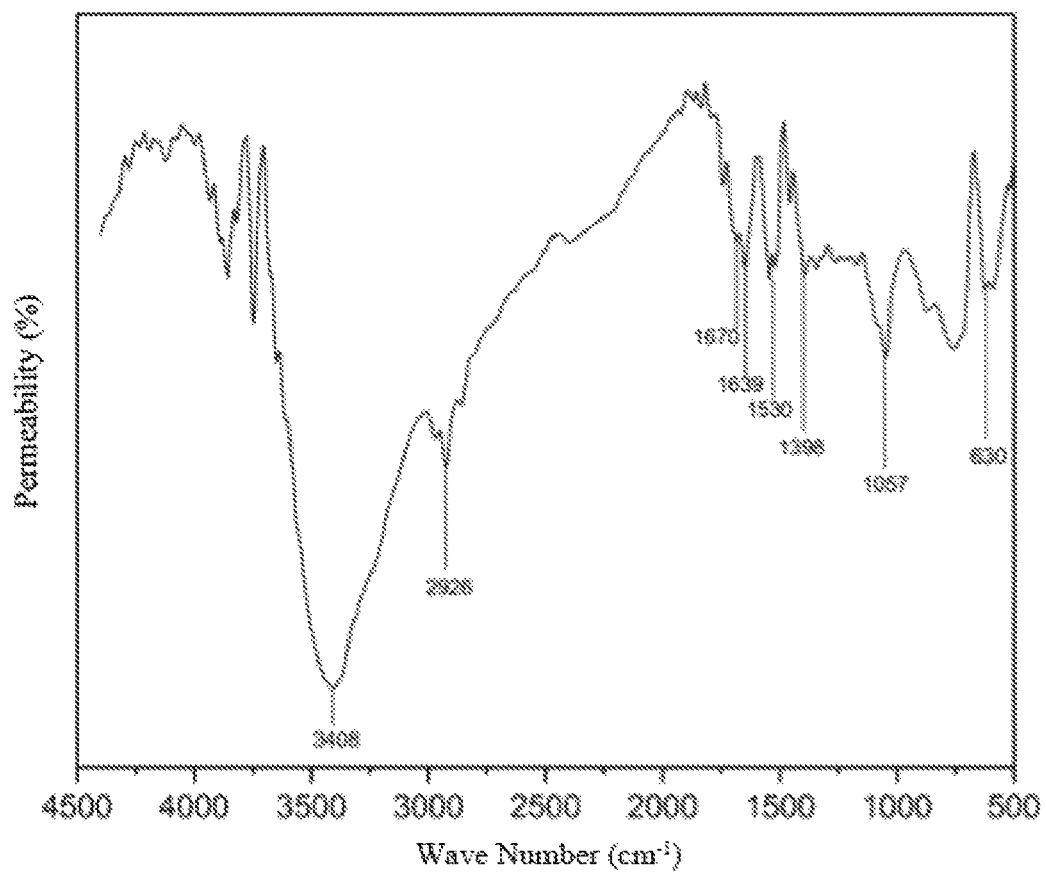
FIG. 1 is an infrared spectrum of a surface-active two-tailed hydrophobic associated polymer.

The present invention is described below in detail according to the drawings and the examples.

I. Preparation of Surface-active Two-tailed Hydrophobic Associated Polymer

Example 1

Weighing acrylamide (10 g), acrylic acid (2.5 g) and surface-active macromonomer polyoxyethylene lauryl ether (methyl) acrylate (0.1 g), adding distilled water and stirring uniformly, and adjusting pH to 7; then, adding N-phenethyl-N-lauryl methacrylamide (0.1 g) and sodium lauryl sulfate (0.3 g), then adding a certain amount of distilled water such that the total mass of the solution reaches 50 g, and stirring till the solution is clear and transparent; introducing nitrogen for 15 min to remove dissolved oxygen in water; and adding an initiator v50 (0.016 wt % of total monomer mass), placing under a photoinitiation device, and reacting for 4 h.

Example 2

Weighing acrylamide (9.9 g), acrylic acid (1.6 g), 2-acrylamide-2-methylpropanesulfonic acid (1.0 g) and surface-active macromonomer polyoxyethylene lauryl ether (methyl) acrylate (0.3 g), adding distilled water and stirring uniformly, and adjusting pH to 7; then, adding N-benzyl-N-lauryl methacrylamide (0.3 g) and sodium lauryl sulfate (0.7), then adding a certain amount of distilled water such that the total mass of the solution reaches 50 g, and stirring till the solution is clear and transparent; introducing nitrogen for 15 min to remove dissolved oxygen in water; and adding an initiator v50 (0.1 wt % of total monomer mass), placing under a photoinitiation device, and reacting for 4 h.

Example 3

Weighing acrylamide (9.9 g), acrylic acid (1.6 g), 2-acrylamide-2-methylpropanesulfonic acid (1.0 g) and surface-active macromonomer polyoxyethylene lauryl ether (methyl) acrylate (0.3 g), adding distilled water and stirring uniformly, and adjusting pH to 7; then, adding N-phenethyl-N-lauryl methacrylamide (0.3 g) and sodium lauryl sulfate (0.7 g), then adding a certain amount of distilled water such that the total mass of the solution reaches 50 g, and stirring till the solution is clear and transparent; introducing nitrogen for 15 min to remove dissolved oxygen in water; and adding an initiator V50 (0.016 wt % of total monomer mass), placing under a photoinitiation device, and reacting for 4 h.

Example 4

Weighing acrylamide (10 g), acrylic acid (2.5 g) and surface-active macromonomer polyoxyethylene lauryl ether (methyl) acrylate (0.3 g), adding distilled water and stirring uniformly, and adjusting pH to 7; then, adding N-phenethyl-N-tetradecyl methacrylamide (0.3 g) and sodium lauryl sulfate (0.7 g), then adding a certain amount of distilled water such that the total mass of the solution reaches 50 g, and stirring till the solution is clear and transparent; introducing nitrogen for 15 min to remove dissolved oxygen in water; and adding an initiator Irgacure2959 (0.016 wt % of total monomer mass), placing under a photoinitiation device, and reacting for 4 h.

II. Structural Characterization of Surface-active Two-tailed Hydrophobic Associated Polymer FIG. 1 is an infrared spectrum of the hydrophobic associated polymer synthesized in the example 1.

As can be seen from FIG. 1, a stretching vibration absorption peak of N-H of primary amide appears at 3408 $cm^{-1}$; a vibration absorption peak of methylene appears at 2926 $cm^{-1}$; a bending vibration absorption peak of primary amide N-H appears at 1639 $cm^{-1}$; a characteristic absorption peak of carbonyl appears at 1670 $cm^{-1}$; a stretching vibration peak of a benzene ring skeleton appears at 1530 $cm^{-1}$; an in-plane bending vibration absorption peak of methylene appears at 1398 $cm^{-1}$; a stretching vibration peak of ethyoxyl appears at 1057 $cm^{-1}$; an out-of-plane rocking characteristic peak of primary amide-$NH_2$ appears at 630 $cm^{-1}$.

III. Viscosifying Effect Analysis of Surface-active Two-tailed Hydrophobic Associated Polymer The polymer synthesized in the example 1 is prepared into polymer solutions of different concentrations. A viscosity-concentration relationship curve of the polymer is measured at room temperature and at a shear rate of 7.34 $s^{-1}$ (as shown in FIG. 2).

Figure 2:
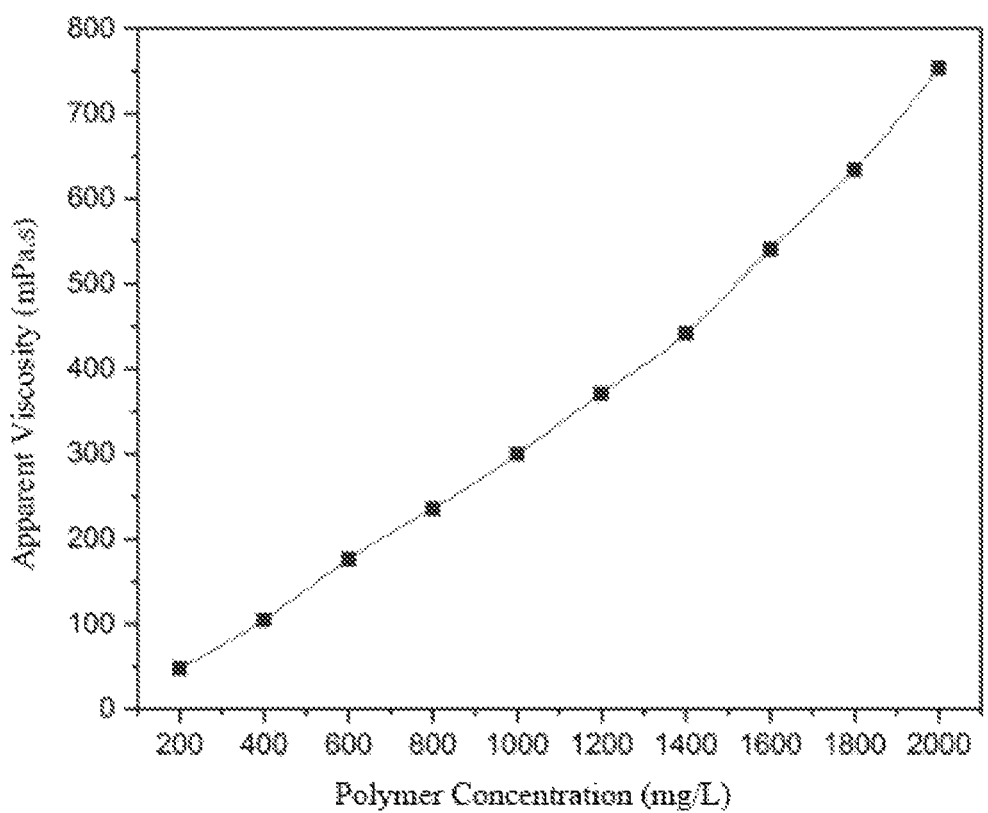
FIG. 2 is a viscosity-concentration relationship curve of the surface-active two-tailed hydrophobic associated polymer.

As can be seen from FIG. 2, the polymer has a strong hydrophobic association effect and a significant viscosifying effect. The viscosity of the polymer solution at 1000 mg/L reaches 300 mPa.s, and the viscosity of the polymer solution at 2000 mg/L reaches 753.4 mPa.s.

IV. Sensitivity to Salt of Surface-active Two-tailed Hydrophobic Associated Polymer A study is made for the sensitivity to salt of the polymer synthesized in the example 1. The prepared hydrophobic associated polymer is prepared into a 1000 mg/L polymer solution under different salinities. A change relationship of the apparent viscosity of the polymer solution along with the salinity is measured at room temperature and at a shear rate of 7.34 s$^{-1}$ (as shown in FIG. 3 and FIG. 4).

Figure 3:
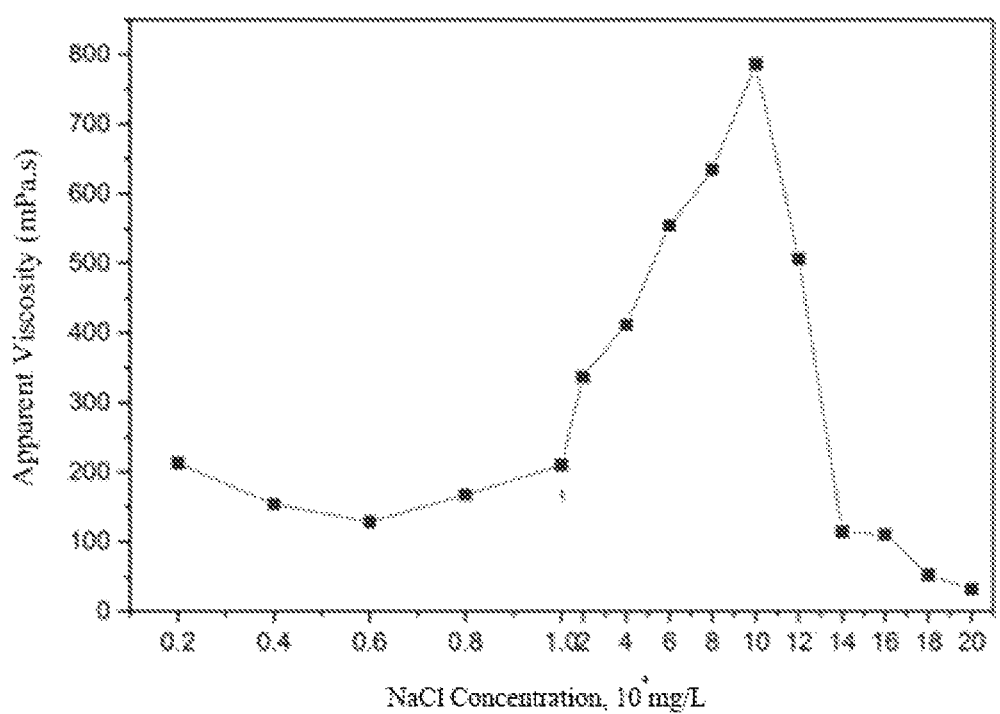
FIG. 3 is a viscosity-NaCl concentration relationship curve of the surface-active two-tailed hydrophobic associated polymer.
Figure 4:
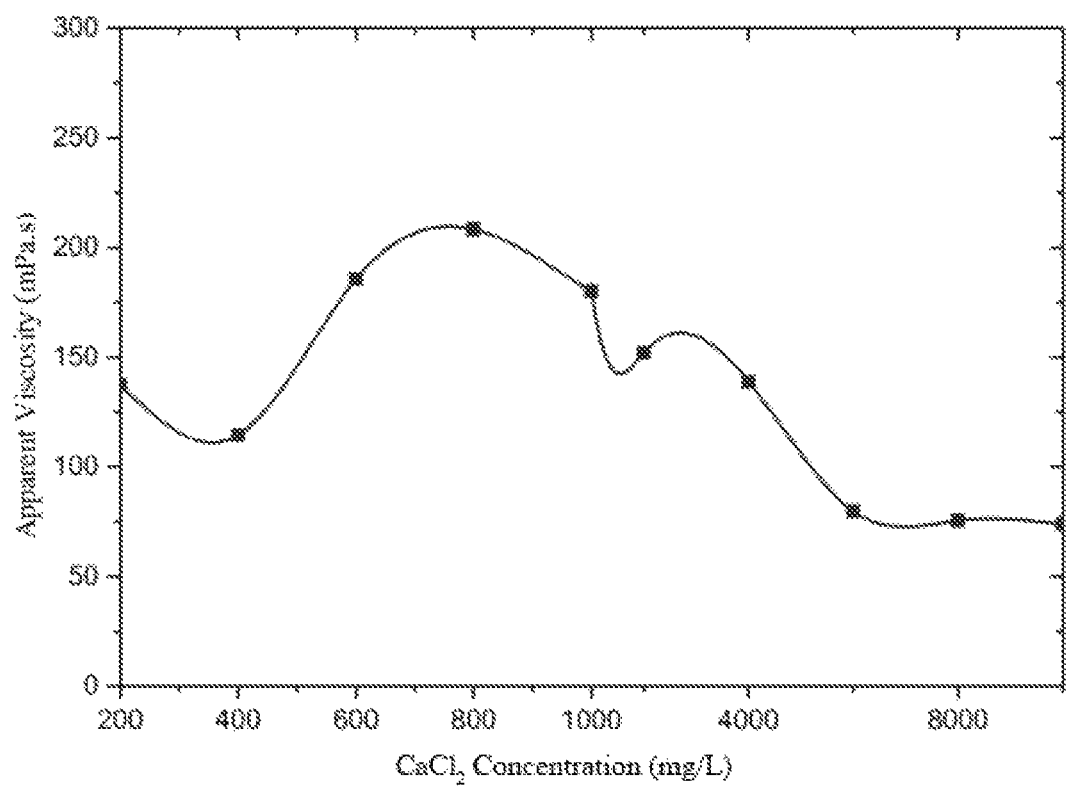
FIG. 4 is a viscosity-$CaCl_2$ concentration relationship curve of the surface-active two-tailed hydrophobic associated polymer.

As can be seen from FIG. 3 and FIG. 4, with the increase of the salinity, the apparent viscosity of the polymer presents a trend of decrease-increase-decrease, with a wider salt thickening area. Moreover, the viscosity of the polymer solution can be maintained at 10% or more under high salinity 200,000 of NaCl and 10,000 of CaCl$_2$, showing a very good salt resistance effect.

V. Anti-aging Property of Surface-active Two-tailed Hydrophobic Associated Polymer The anti-aging property of the polymer synthesized in the example 1 is evaluated. The prepared hydrophobic associated polymer is prepared into a 1000 mg/L polymer solution, deoxidant is added to the solution and then the mixture is placed in a vial, and sealed. The mixture is aged in a 90° C. oven, and the viscosity of the polymer solution is measured at regular time.

Figure 5:
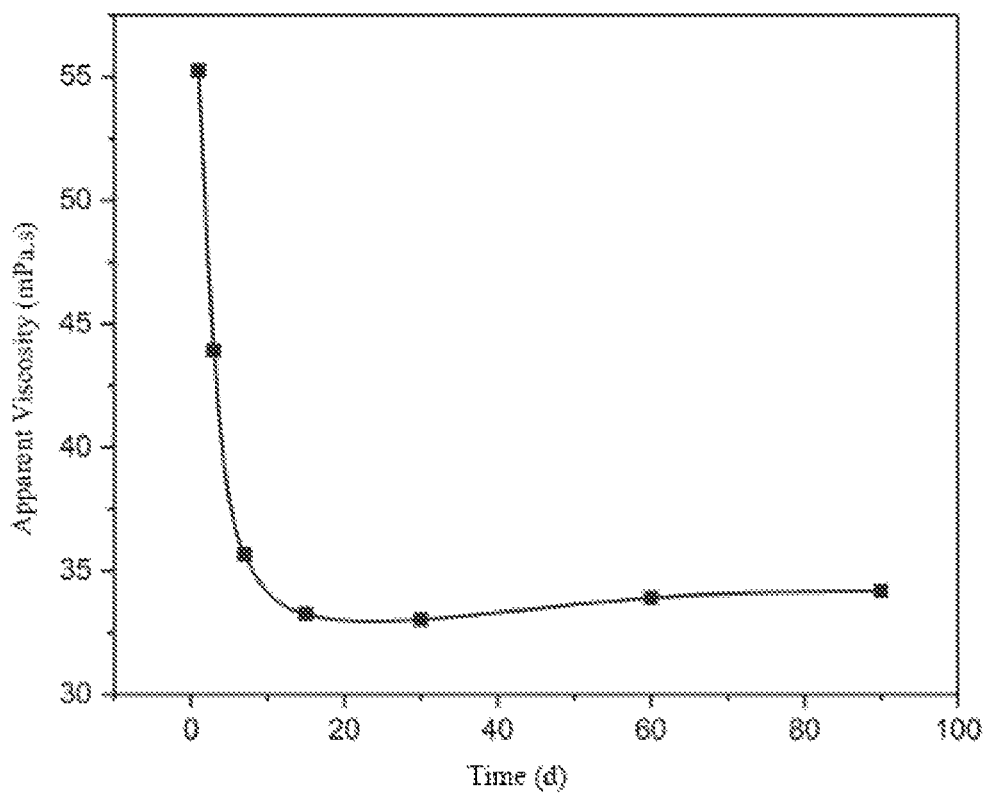
FIG. 5 is a viscosity-aging days relationship curve of the surface-active two-tailed hydrophobic associated polymer.

As can be seen from FIG. 5, the viscosity is basically stable after the polymer solution is aged for about 25 d. At a temperature of 90° C. and a salinity of 10×10$^4$ mg/L, the viscosity of the polymer solution can still be maintained at 30 mPa.s or more, showing good resistance to temperature, salt and aging.

What is claimed is:

1. A surface-active two-tailed hydrophobic associated polymer, having comprising a structural formula as follows:

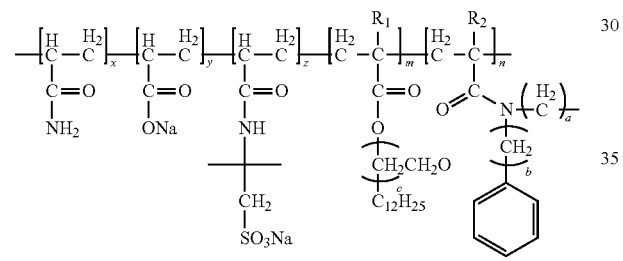

wherein in the formula, x, y, z, m, and n are percentages of a first structural units; and x is 75 to 85%, y is 10 to 20%, z is 0 to 5%, m is 0.1 to 0.2%, n is 0.2 to 0.5%; and x+y+z+m+n is 1;

a and b are numbers of a second structural units, c is the number of a third structural unit, and a is 7, 9, 11, 13 or 15, b is 1 or 2, and c is 5, 7, 10, 23 or 40;

and R$_1$ and R$_2$ are CH$_3$ or H.

2. The surface-active two-tailed hydrophobic associated polymer according to claim 1, wherein the surface-active two-tailed hydrophobic associated polymer has a viscosity average molecular weight of 100 to 10,000,000.

3. A preparation process of the surface-active two-tailed hydrophobic associated polymer according to claim 1, sequentially comprising the following steps:

(1) adding acrylamide, acrylic acid, 2-acrylamide-2-methylpropanesulfonic acid, and surface-active macromonomer polyoxyethylene lauryl ether (methyl) acrylate to distilled water to obtain a first solution, stirring uniformly, adjusting pH of the first solution to 6-8 with sodium hydroxide to obtain a second solution, adding a hydrophobic monomer N-phenethyl-N-alkyl (methyl) acrylamide or N-benzyl-N-alkyl (methyl) acrylamide and a surfactant sodium lauryl sulfate to the second solution to obtain a third solution, and stirring till the third solution is clear and transparent, a total mass percentage of reaction monomers of the third solution is 25 to 30 wt %, wherein the acrylamide accounts for 20 to 21.5 wt %, the acrylic acid accounts for 3.5 to 5 wt %, the 2-acrylamide-2-methylpropanesulfonic acid accounts for 0 to 2 wt %, the polyoxyethylene lauryl ether (methyl) acrylate accounts for 0.2 to 0.6 wt %, the N-phenethyl-N-alkyl (methyl) acrylamide or the N-benzyl-N-alkyl (methyl) acrylamide accounts for 0.2 to 0.6 wt %, and the sodium lauryl sulfate accounts for 0.8 to 2.0 wt %;

(2) introducing nitrogen for 15 min to remove dissolved oxygen in the distilled water of the third solution to obtain a fourth solution; and (3) adding a photoinitiator to the fourth solution and reacting for 3 to 5 h at 10 to 30° C. under a photoinitiation device to obtain a viscous white colloid, the viscous white colloid is the surface-active two-tailed hydrophobic associated polymer.

4. The preparation of the surface-active two-tailed hydrophobic associated polymer according to claim 3, wherein the photoinitiator is azobis (isobutylamidine hydrochloride) or 2-hydroxyl-4'-(2-hydroxyethoxy)-2-methylpropiophenone.

5. The preparation process of the surface-active two-tailed hydrophobic associated polymer according to claim 2, sequentially comprising the following steps:

(1) adding acrylamide, acrylic acid, 2-acrylamide-2-methylpropanesulfonic acid, and surface-active macromonomer polyoxyethylene lauryl ether (methyl) acrylate to distilled water to obtain a first solution, stirring uniformly, adjusting pH of the first solution to 6-8 with sodium hydroxide to obtain a second solution, adding a hydrophobic monomer N-phenethyl-N-alkyl (methyl) acrylamide or N-benzyl-N-alkyl (methyl) acrylamide and a surfactant sodium lauryl sulfate to the second solution to obtain a third solution, and stirring till the third solution is clear and transparent, a total mass percentage of reaction monomers of the third solution is 25 to 30 wt %, wherein the acrylamide accounts for 20 to 21.5 wt %, the acrylic acid accounts for 3.5 to 5 wt %, the 2-acrylamide-2-methylpropanesulfonic acid accounts for 0 to 2 wt %, the polyoxyethylene lauryl ether (methyl) acrylate accounts for 0.2 to 0.6 wt %, the N-phenethyl-N-alkyl (methyl) acrylamide or the N-benzyl-N-alkyl (methyl) acrylamide accounts for 0.2 to 0.6 wt %, and the sodium lauryl sulfate accounts for 0.8 to 2.0 wt %;

(2) introducing nitrogen for 15 min to remove dissolved oxygen in the distilled water of the third solution to obtain a fourth solution; and (3) adding a photoinitiator to the fourth solution and reacting for 3 to 5 h at 10 to 30° C. under a photoinitiation device to obtain a viscous white colloid, the viscous white colloid is the surface-active two-tailed hydrophobic associated polymer.

6. The preparation of the surface-active two-tailed hydrophobic associated polymer according to claim 5, wherein the photoinitiator is azobis (isobutylamidine hydrochloride) or 2-hydroxyl-4'-(2-hydroxyethoxy)-2-methylpropiophenone.

* * * * *